(12) United States Patent
Hecht et al.

(10) Patent No.: US 9,089,910 B2
(45) Date of Patent: Jul. 28, 2015

(54) CUTTING TOOL AND CLAMPING MECHANISM FOR HOLDING A CUTTING INSERT THERETO

(75) Inventors: Gil Hecht, Nahariya (IL); Danny Chen, Nahariya (IL)

(73) Assignee: Iscar, Ltd., Tefen (IL)

( * ) Notice: Subject to any disclaimer, the term of this patent is extended or adjusted under 35 U.S.C. 154(b) by 358 days.

(21) Appl. No.: 13/552,262

(22) Filed: Jul. 18, 2012

(65) Prior Publication Data

US 2013/0034394 A1   Feb. 7, 2013

Related U.S. Application Data

(60) Provisional application No. 61/514,322, filed on Aug. 2, 2011.

(51) Int. Cl.
*B23C 5/22* (2006.01)

(52) U.S. Cl.
CPC .......... *B23C 5/2221* (2013.01); *B23B 2205/08* (2013.01); *B23C 2200/361* (2013.01); *B23C 2210/165* (2013.01); *B23C 2265/12* (2013.01); *Y10T 407/228* (2015.01); *Y10T 407/23* (2015.01)

(58) Field of Classification Search
CPC .......... B23B 2205/04; B23B 2205/08; B23B 27/1662; B23B 27/1614; B23B 2210/08
USPC .......... 407/113, 102–104, 106, 107
See application file for complete search history.

(56) References Cited

U.S. PATENT DOCUMENTS 3,491,421 A    1/1970  Holloway
4,283,163 A *  8/1981  Grafe et al. .................. 407/104
5,873,682 A *  2/1999  Tripsa .......................... 407/101
6,086,290 A *  7/2000  Qvarth et al. .................. 407/38
6,139,227 A   10/2000  Schafer et al.
6,158,928 A * 12/2000  Hecht ........................... 407/102
6,599,060 B2 * 7/2003  Hecht ........................... 407/102
6,607,333 B2 * 8/2003  Satran et al. .................. 407/33
7,168,895 B2 * 1/2007  Koskinen et al. ............. 409/140

(Continued)

FOREIGN PATENT DOCUMENTS

CA    1070098      1/1980
GB    2030899 A    4/1980

(Continued)

OTHER PUBLICATIONS

International Search Report dated Nov. 9, 2012 issued in PCT counterpart application (No. PCT/IL2012/050250).

*Primary Examiner* — Sunil K Singh
*Assistant Examiner* — Sara Addisu
(74) *Attorney, Agent, or Firm* — Womble Carlyle

(57) ABSTRACT

A cutting tool (10) includes a cutting portion (14) and a clamping mechanism (16) configured to be brought between an unclamped position in which a cutting insert (12) is removable from the cutting portion (14), and a clamped position in which the cutting insert (12) is clamped to the cutting portion (14). The clamping mechanism (16) includes a clamp (20) and a cam shaft (18). The clamp (20) is formed with a growth pattern region (20C6) having a varying diameter. The cam is formed with a growth pattern region (18C1) having a varying diameter. The growth pattern regions (20C6, 18C4) are configured for engaging each other to transform rotary motion of the cam shaft (18) into linear motion of the clamp (20) to thereby move the clamping mechanism (16) into the clamped position.

27 Claims, 8 Drawing Sheets

(56) References Cited

U.S. PATENT DOCUMENTS

| | | | |
|---|---|---|---|
| 7,168,896 B2 * | 1/2007 | Koskinen et al. | 409/140 |
| 7,347,650 B2 * | 3/2008 | Tipu | 407/105 |
| D638,452 S * | 5/2011 | Morrison et al. | D15/139 |
| 7,959,383 B2 * | 6/2011 | Choi et al. | 407/105 |
| 8,007,207 B2 | 8/2011 | Rimet | 407/46 |
| 8,308,398 B2 * | 11/2012 | Hecht | 407/38 |
| 8,308,403 B2 * | 11/2012 | Hecht | 408/239 R |
| 8,317,436 B2 * | 11/2012 | Harif | 407/113 |
| 8,573,903 B2 * | 11/2013 | Morrison et al. | 407/113 |
| 8,746,115 B2 * | 6/2014 | Hecht | 82/1.11 |
| 8,747,031 B2 * | 6/2014 | Hecht | 407/103 |
| 8,882,404 B2 * | 11/2014 | Harif | 407/40 |
| 2004/0071515 A1 * | 4/2004 | Arvidsson et al. | 407/113 |
| 2005/0152754 A1 * | 7/2005 | Wiman et al. | 407/103 |
| 2006/0291965 A1 | 12/2006 | Erikson et al. | |
| 2007/0189862 A1 * | 8/2007 | Viol | 407/113 |
| 2008/0056831 A1 * | 3/2008 | Wiman et al. | 407/102 |
| 2008/0193233 A1 | 8/2008 | Park | |
| 2010/0104384 A1 | 4/2010 | Orlov et al. | |
| 2010/0189520 A1 | 7/2010 | Guy | |
| 2010/0272522 A1 * | 10/2010 | Hecht | 407/103 |
| 2011/0305532 A1 | 12/2011 | Harif | |
| 2013/0071194 A1 * | 3/2013 | Hecht | 407/103 |
| 2013/0121776 A1 * | 5/2013 | Majima | 407/104 |

FOREIGN PATENT DOCUMENTS

| | | |
|---|---|---|
| SU | 986618 A1 | 1/1983 |
| WO | WO 2010067369 A2 * | 6/2010 |

* cited by examiner

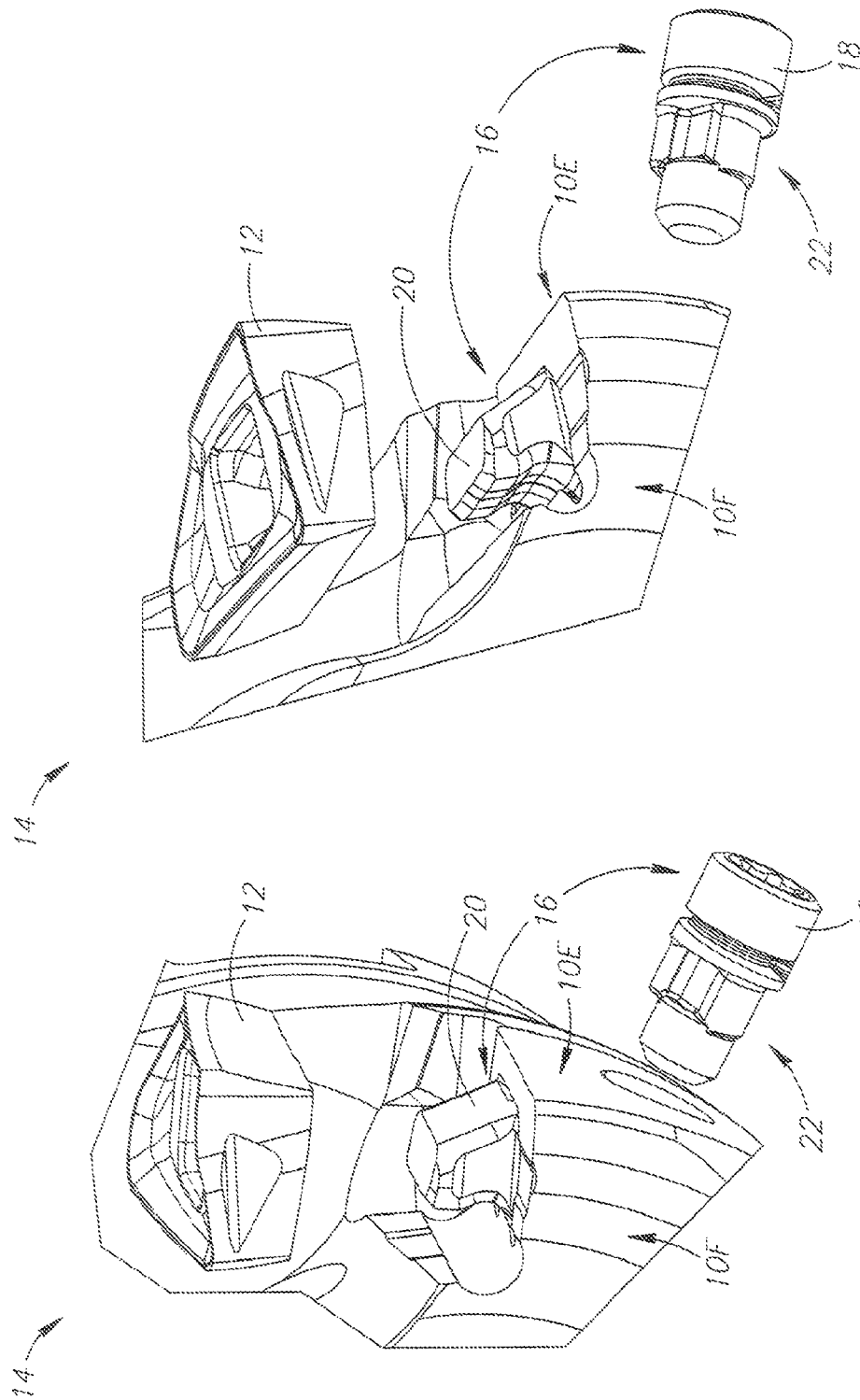

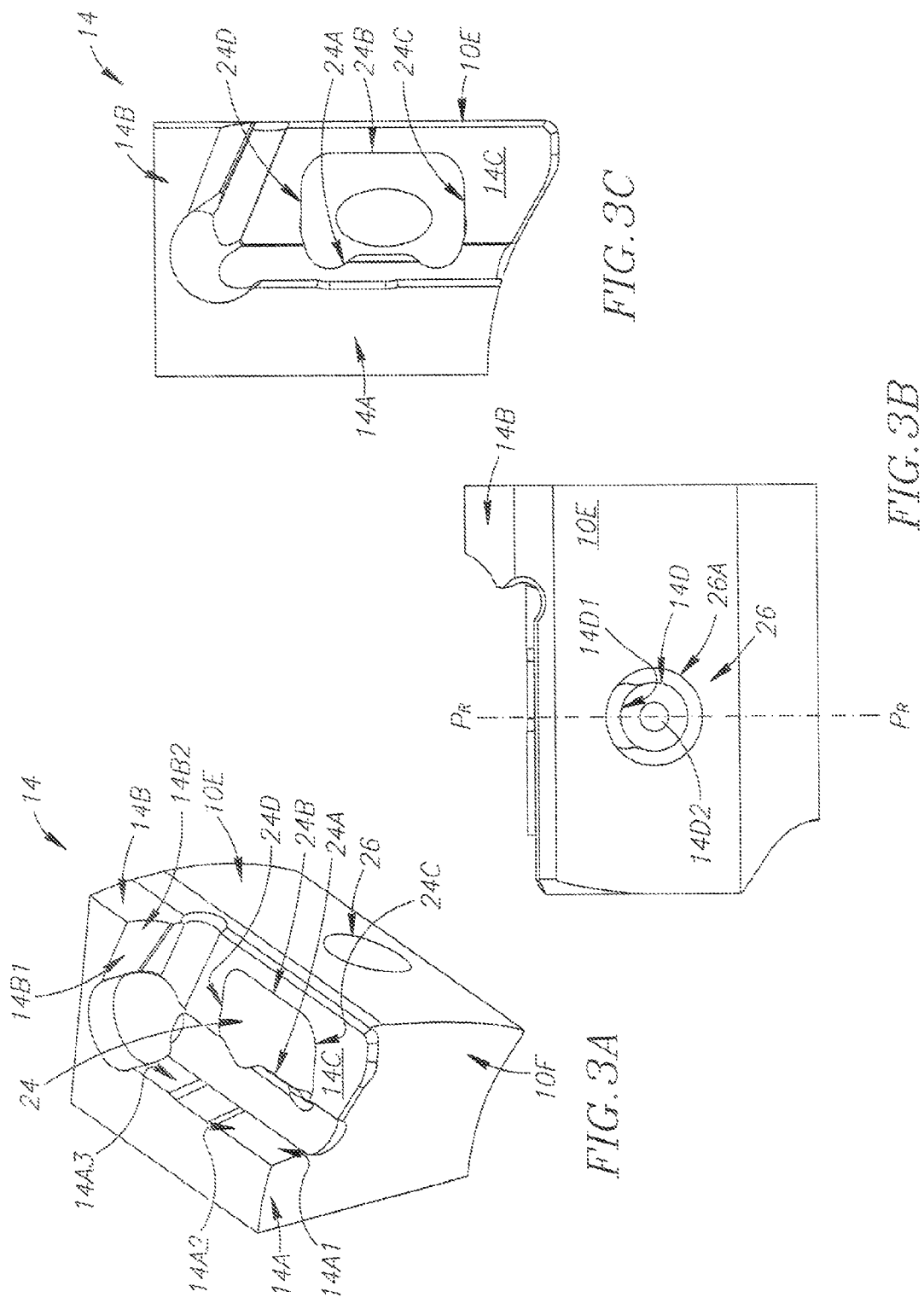

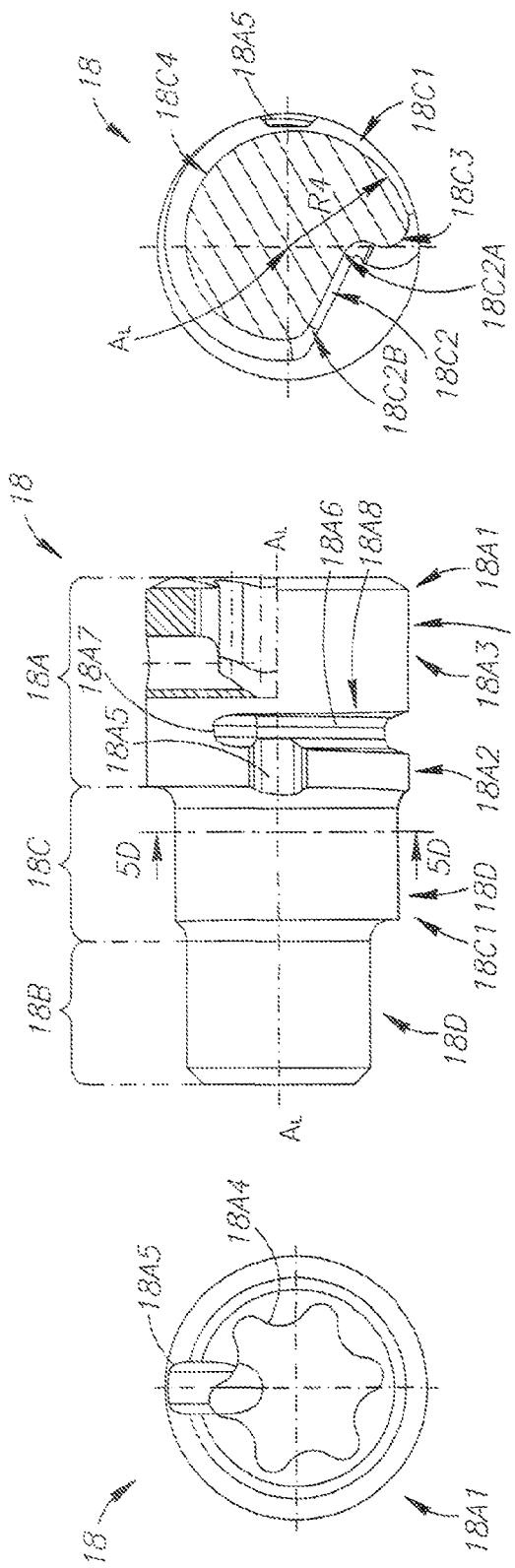

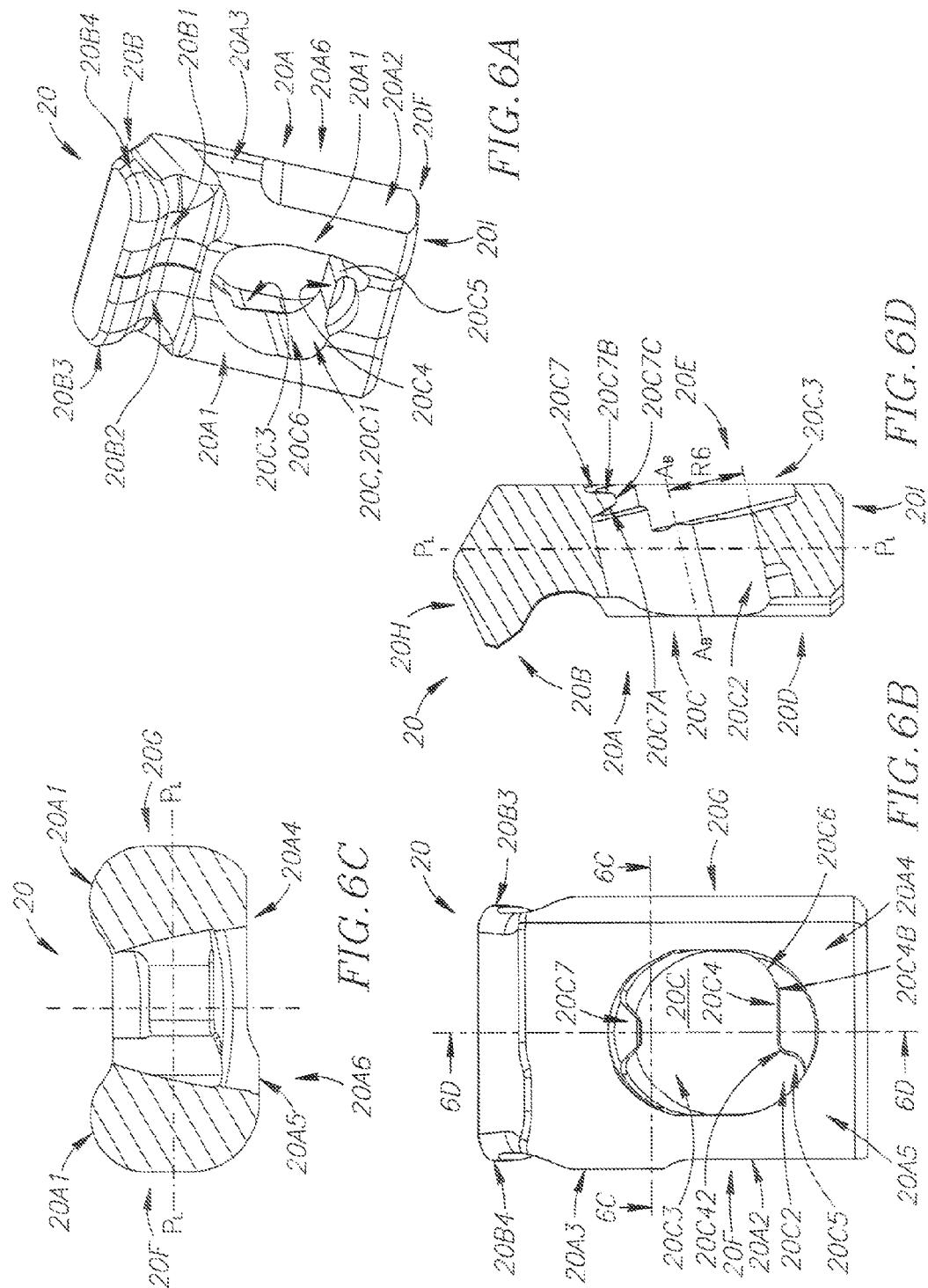

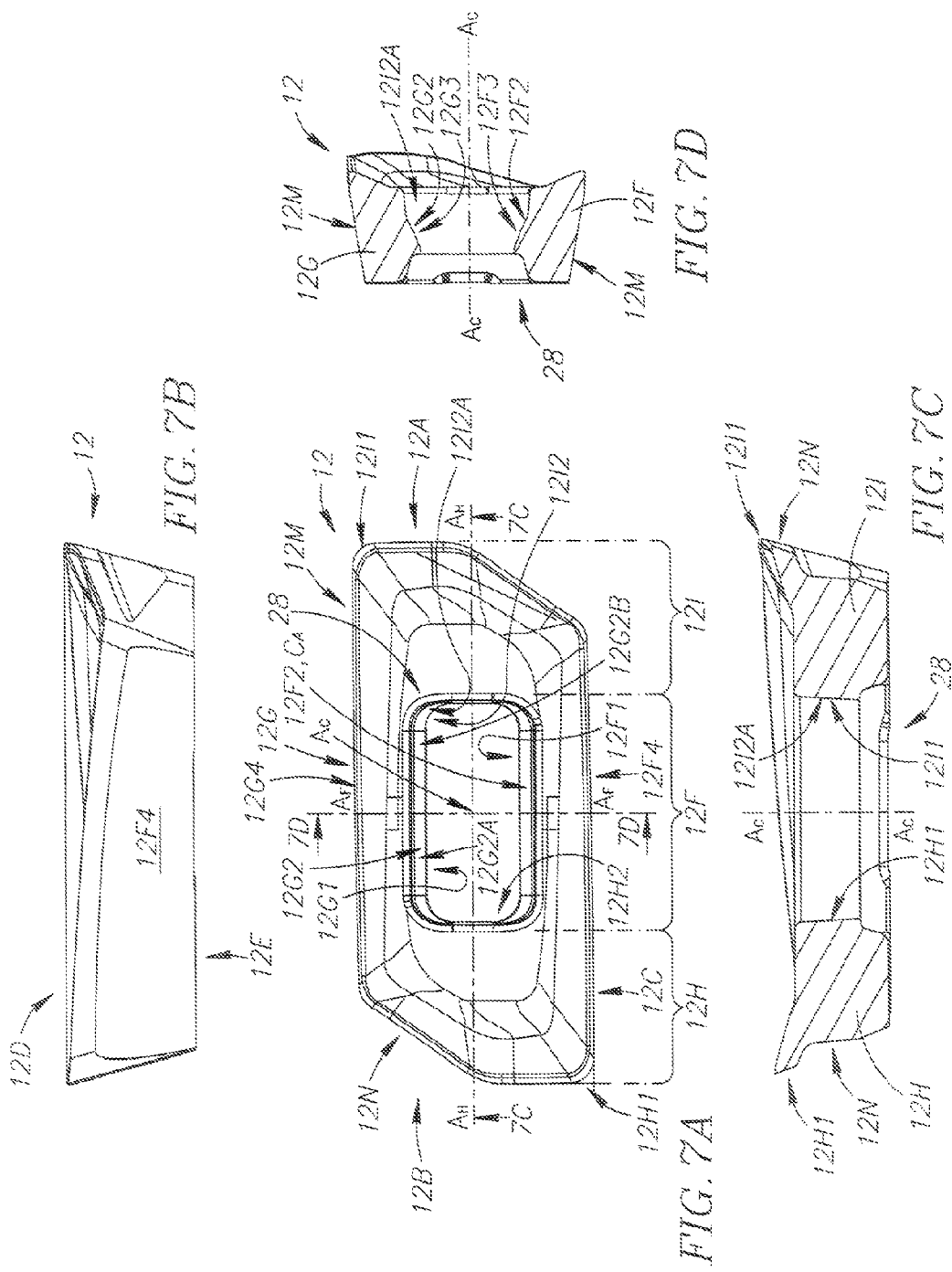

CUTTING TOOL AND CLAMPING MECHANISM FOR HOLDING A CUTTING INSERT THERETO

RELATED APPLICATIONS

The present application claims priority to U.S. Provisional Patent Application No. 61/514,322, filed 2 Aug. 2011, the contents of which are incorporated by reference in their entirety.

FIELD OF THE INVENTION

The subject matter of the present application relates to cutting tools and clamping mechanisms for holding cutting inserts thereto, and in particular to clamping mechanisms configured to be brought to a clamped position, wherein the cutting insert is clamped to the cutting tool, and an unclamped position, wherein the cutting insert can be removed from the cutting tool.

BACKGROUND OF THE INVENTION

Cutting tools are often used with cutting inserts. The cutting inserts can be clamped to the cutting tool by bringing a clamping mechanism of the cutting tool to a clamped position. When the cutting insert needs to be replaced, the clamping mechanism can be brought to an unclamped position and the cutting insert can then removed and replaced with another such cutting insert.

US 2010/0104384A1, CA 1070098 and U.S. Pat. No. 6,139,227 disclose cutting tools, clamping mechanisms and cutting inserts.

SUMMARY OF THE INVENTION

In accordance with a first aspect of the subject matter of the present application, there is provided a cutting insert formed with a cutting insert through bore which, when viewed in a plan view, has an elongated shape.

In accordance with another aspect, a cutting insert can comprise: opposing upper and lower surfaces, opposing longitudinal side surfaces and opposing lateral side surfaces extending transversely to and connecting the opposing longitudinal side surfaces; a cutting insert through bore passing between the opposing upper and lower surfaces, the cutting insert through bore having an elongated shape in a plan view of the upper surface; opposing first and second longitudinal walls extending between the upper and lower surfaces and defined between a portion of each of the longitudinal side surfaces and the through bore; and opposing first and second transverse walls extending between the opposing upper and lower surfaces, and extending transverse, and connected, to the opposing first and second longitudinal walls; wherein: the cutting insert through bore being defined between inner surfaces of the opposing first and second longitudinal walls and the first and second transverse walls; and each of the inner surfaces of the first and second longitudinal walls is formed with a protruding clamping lip which projects into the through bore.

According to yet another aspect of the subject matter of the present application, there is provided a cutting tool comprising a cutting portion and a clamping mechanism configured to be brought between an unclamped position in which a cutting insert is removable from the cutting portion, and a clamped position in which the cutting insert is clamped to the cutting portion; wherein: the cutting portion comprises a seating surface and a peripheral surface extending therefrom, a cutting portion bore formed in the seating surface, and a cam opening formed in the peripheral surface and extending to the cutting portion bore; the clamping mechanism comprising a clamp and an elongated cam shaft; the clamp comprises a clamp body portion disposed at least partially inside the cutting portion bore, a clamp head portion connected to the clamp body portion and disposed external to the cutting portion bore, and a clamp through-bore formed in the clamp body portion and comprising an internal clamp surface formed with a clamp growth pattern region having a varying diameter; the cam shaft comprises an external cam surface, a first cam end and a central cam portion extending from the first cam end; the central cam portion having a clamping section formed with a cam growth pattern region having a varying diameter; the first cam end being disposed in the cam opening and the central cam portion being disposed in the clamp through-bore; and the clamp and cam growth pattern regions being configured for engaging each other to transform rotary motion of the cam shaft into linear motion of the clamp to thereby bring the clamping mechanism into the clamped position in which the clamp head portion is closer to the seating surface than it is in the unclamped position.

According to still another aspect of the subject matter of the present application, there is provided a cutting tool cam shaft comprising: a first cam end having an unclamping section comprising a groove having a depth that increases in a first circumferential direction of the cutting tool cam shaft; a second cam end; a central cam portion located between the first and second cam ends, the central cam portion having a clamping section formed with a circumferentially extending cam growth pattern region having a diameter that increases in a second circumferential direction opposite the first circumferential direction; and an external cam surface formed with a longitudinally extending notch which extends to the unclamping section.

According to yet another aspect of the subject matter of the present application, there is provided a cutting tool clamp comprising: a clamp body portion having opposing front and rear major clamp faces connected to opposing first and second minor side clamp faces; a clamp head portion connected to the clamp body portion; a clamp through-bore formed in the clamp body portion and passing through the front and rear major clamp faces; wherein: the clamp through-bore comprises: an internal clamp surface formed with a clamp growth pattern region having a varying diameter; and a clamp projection protruding into the clamping through bore.

According to another aspect of the subject matter of the present application, there is provided a cutting tool clamping mechanism assembly comprising, in combination: a cutting tool cam shaft having any of the features described above and a cutting tool clamp having any of the features described above, wherein: the central cam portion of the cutting tool cam shaft is receivable into the clamp through bore of the cutting tool clamp; and the clamping section of the cutting tool cam shaft is engageable with the internal clamp surface of the cutting tool clamp, such that rotary motion of the cutting tool cam shaft results in linear motion of the cutting tool clamp.

According to a still another aspect of the subject matter of the present application, there is provided a cutting tool cutting portion having a clamping mechanism opening for receiving a portion of a cam shaft therein, the clamping mechanism comprising: first and second spaced seating regions defining a constriction in the opening, a major peripheral edge extending from the first seating region to the second seating region and formed on a first side of the constriction, an additional peripheral edge extending from the first seating region to the second seating region and formed on a second side of the constriction distinct from the first side of the constriction.

The clamping mechanism opening has a non-circular shape.

According to a further aspect of the subject matter of the present application, there is provided a cutting tool for holding a cutting insert, comprising a cam shaft and a cutting portion having a clamping mechanism opening configured for receiving a first portion of a cam shaft therein; the clamping mechanism opening comprising first and second spaced seating regions defining a constriction in the opening, and a major peripheral edge extending from the first seating region to the second seating region and formed on a first side of the constriction; the first portion of the cam shaft, being located at least partially at the first side of a constriction; and a dimension of the constriction, being smaller than an external dimension of the cam shaft's first portion for restricting passage of the cam shaft therethrough.

It will be understood that the subject matter of the present application relates to a cutting tool and inventive aspects of elements thereof, including but not limited to cutting portions, cam shafts, clamps, clamping mechanisms and clamping mechanism openings thereof. While each aspect may be separately inventive, they could also be part of a single cutting tool as will be elaborated below.

It will be understood that the above-said is a summary, and that any of the aspects above may further comprise any of the features described in connection with any of the other aspects or described hereinbelow. Specifically, the following features, either alone or in combination, may be applicable to any of the above aspects:

A. A cutting insert can be single sided.
B. A cutting insert can have dissimilar shaped upper and lower surfaces.
C. A cutting insert can have one or more protruding clamping lips. Each protruding clamping lip can be elongated in a direction parallel with a longitudinal cutting insert axis of the cutting insert. Each protruding clamping lip can be spaced from an upper surface. Each protruding clamping lip can be slanted towards a longitudinal cutting insert axis and in a direction of a lower surface, such that an upper abutment surface thereof faces in the direction of an upper surface.
D. Inner surfaces of first and second transverse walls can be flat.
E. A cam shaft's groove's longitudinal width can increase with its depth, along a first circumferential direction.
F. A cross sectional area of each longitudinal wall, measured perpendicular to a longitudinal cutting insert axis of a cutting insert can be the same at each axial location along the longitudinal cutting insert axis.
G. A clamp can comprise a guide arrangement.
H. A guide arrangement can comprise a first recess and a first pivot projection formed on a minor clamp face, and a second recess and a second pivot projection formed on a major clamp face.
I. A clamp head portion can comprise at least two spaced projecting portions formed at a front major clamp face of a clamp, and a first side projecting portion formed at a second minor clamp face.
J. A clamp head portion can comprise a second side projecting portion formed at a first minor clamp face.
K. A clamp can comprise a clamp projection configured for engaging an unclamping section of a cam shaft and causing movement of the clamp in a direction away from a seating surface.
L. A clamp can comprise a clamp projection configured for engaging a cam shaft and preventing undesired ejection of the cam shaft from a cutting portion in clamped and unclamped positions.
M. An unclamping section can comprise a groove having a varying depth.
N. A cam shaft can comprise an unclamping section configured for causing linear motion of a clamp away from a seating surface to bring a clamping mechanism into an unclamped position.
O. A cam shaft and clamp can be the only elements of a clamping mechanism.
P. An external cam surface of a cam shaft can be formed with a notch extending to an unclamping section of a cam shaft and sized to allow a portion of a clamp projection of a clamp to pass therethrough.
Q. A cam shaft can comprise an unclamping section and a clamping section, both having varying diameters which follow growth patterns in opposite directions.
R. A cam shaft can comprise a cam shoulder abutment region.
S. A clamp can comprise a clamp shoulder abutment region.
T. Cam and clamp shoulder abutment regions can be configured to abut each other for stopping rotation of a cam shaft at an unclamped position.
U. A cutting portion can be formed with a cam recess coaxial with a cam opening.
V. A cam shaft can comprise a second cam end which extends in an axial direction from a central cam portion on an opposite side of a first cam end
W. A cam recess can be configured to receive a second cam end.
X. A cam opening can comprise first and second spaced seating regions defining a constriction in an opening. A major peripheral edge can extend from the first seating region to the second seating region and can be formed on a first side of the constriction. An additional peripheral edge can extend from the first seating region to the second seating region and can be formed on a second side of the constriction distinct from the first side of the constriction.
Y. A clamp, at a first clamp face thereof, can comprise a guide arrangement comprising a first recess and an associated first pivot projection.
Z. At a second clamp face which is distinct from a first clamp face a guide arrangement can comprise a second recess and an associated second pivot projection.
AA. A clamp head portion can comprise a projecting portion formed at a first clamp face of a clamp.
BB. A clamp head portion can comprise two spaced projecting portions formed at a second clamp face of a clamp, which second clamp face is distinct from a first clamp face.
CC. A clamp can be configured to engage a cutting insert with exactly three projecting portions formed on a clamp head portion. Each of the three projecting portions can be configured to engage a cutting insert at a single corresponding clamp engagement point
DD. A cutting portion can comprise first and second wall portions which, together with a seating surface, can define an insert pocket of the cutting portion.
EE. A cutting insert can be retained in a cutting portion.
FF. A cutting insert can have a plurality of clamp engagement points on an inner surface thereof. Each clamp engagement point can be adjacent to one of first and second wall portions of a cutting portion.
GG. A first seating region can have a first seating center point and a second seating region can have a second seating center point.

HH. A major peripheral edge can comprise two major edge ends, each major edge end being adjacent a corresponding seating region, the major peripheral edge having a major center point defined by a largest possible arc which can be inscribed within the major peripheral edge.

II. An additional peripheral edge can comprise two additional edge ends, each additional edge end being adjacent a corresponding seating region on the second side.

JJ. An additional peripheral edge can have an additional center point defined by a largest possible arc which can be inscribed within the additional peripheral edge.

KK. A major center point and an additional center point can be spaced from both the first and second seating center points.

LL. First and second seating center points can be colocated at a common seating center point.

MM. A major center point and an additional center point can be respectively located at one of the first and second sides of the constriction.

NN. A major center point and an additional center point can be disposed on an imaginary plane which passes between first and second spaced seating regions and extends on both sides of a constriction.

OO. At least one seating region has a concave shape, in a plan view of a clamping mechanism opening.

PP. At least one seating region comprises a line segment, in a plan view of the clamping mechanism opening.

QQ. The major peripheral edge and/or the additional peripheral edge can have a concave shape.

RR. A cutting tool for holding a cutting insert, can comprise a cam shaft and a cutting portion having a clamping mechanism opening configured for receiving a first portion of the cam shaft therein.

SS. A clamping mechanism opening can comprise first and second spaced seating regions defining a constriction in the opening, and a major peripheral edge extending from the first seating region to the second seating region and formed on a first side of the constriction.

TT. A first portion of a cam shaft can be located at least partially at a first side of a constriction.

UU. A dimension of a constriction can be smaller than twice the magnitude of an external radius dimension of a cam shaft's first portion, for restricting passage of the cam shaft therethrough.

VV. A clamping mechanism opening can comprise an additional peripheral edge which extends from a first seating region to a second seating region and is formed on a second side of a constriction distinct from a first side thereof.

WW. A constriction can be sized to prevent passage of a cam shaft therethrough to the extent that it can contact an additional peripheral edge.

XX. A clamping mechanism opening can be configured for receiving a portion of a cam shaft therein. More precisely, a major peripheral edge can be configured for receiving a portion of a cam shaft therein.

YY. A first seating region can have a first seating center point and the second seating region can have a second seating center point.

ZZ. A major peripheral edge can comprise two major edge ends. Each major edge end can be adjacent a corresponding one of the seating regions. The major peripheral edge can have a major center point defined by a largest possible arc which can be inscribed within the major peripheral edge.

AAA. An additional peripheral can comprise two additional edge ends. Each additional edge end can be adjacent a corresponding one of the seating regions on the second side. The additional peripheral edge having an additional center point defined by a largest possible arc which can be inscribed within the additional peripheral edge.

BBB. A major center point, and an additional center point can be spaced from both the first and second seating center points.

CCC. A clamping mechanism opening can comprise an uppermost central point and a lowermost central point located further from the head portion than the uppermost central point. Seating regions can be closer to the uppermost central point than to the lowermost central point.

DDD. A cutting tool can comprise an additional clamping mechanism opening having first and second spaced seating regions defining a constriction in an opening, and formed in a body portion and configured to receive a second portion of the cam shaft, distinct from a first portion of a cam shaft, therein.

EEE. A magnitude of an external radius of an end portion received in a clamping mechanism opening can be smaller than the magnitude of the radius of a major peripheral edge.

FFF. Seating regions can have a curvature corresponding to a curvature of an end portion received therein.

BRIEF DESCRIPTION OF THE DRAWINGS

For a better understanding of the subject matter of the present application, and to show how the same may be carried out in practice, reference will now be made to the accompanying drawings, in which:

FIG. 2A is a front perspective exploded view of a portion of the cutting tool in FIG. 1;

FIG. 2B is another front perspective exploded view of a portion of the cutting tool in FIGS. 1 and 2A;

FIG. 3A is a perspective view of a portion of a cutting portion of the cutting tool in FIGS. 1 to 2B;

FIG. 3B is a side view of the portion of the cutting portion in FIG. 3A;

FIG. 3C is a plan view of the portion of the cutting portion in FIGS. 3A and 3B;

FIG. 5A is a perspective view of a cam shaft of the cutting tool in FIGS. 1 to 2B;

FIG. 5B is a side view of the cam shaft in FIG. 5A;

FIG. 5C is a side view of the cam shaft in FIGS. 5A and 5B, rotated from the view in FIG. 5B;

FIG. 5D is a cross section view taken along line 5D-5D in FIG. 5C;

FIG. 5E is a rear view of the cam shaft in FIGS. 5A to 5D;

FIG. 6A is a front perspective view of a clamp of the cutting tool in FIGS. 1 to 2B;

FIG. 6B is a rear view of the clamp in FIG. 6A;

FIG. 6C is a cross section plan view taken along line 6C-6C in FIG. 6B;

FIG. 6D is a cross section side view taken along line 6D-6D in FIG. 6B;

FIG. 7A is a plan view of a cutting insert of the cutting tool in FIGS. 1 to 2B;

FIG. 7B is a side view of the cutting insert in FIG. 7A;

FIG. 7C is a cross section view taken along line 7C-7C in FIG. 7A;

FIG. 7D is a cross section view taken along line 7D-7D in FIG. 7A;

DETAILED DESCRIPTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific details presented herein.

Figure 1:
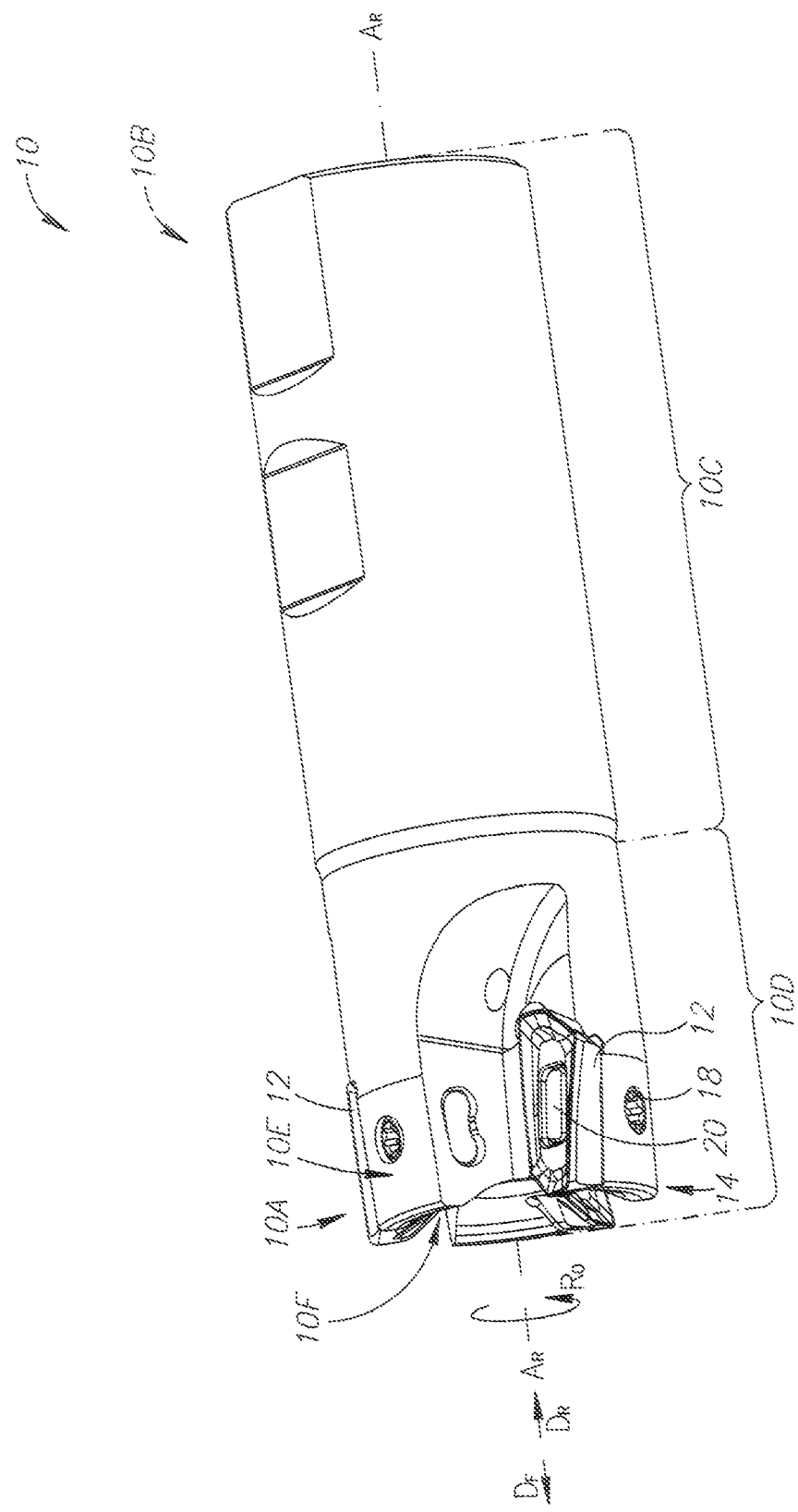
FIG. 1 is a side perspective view of a cutting tool in a clamped state.

Reference is now made to FIG. 1, showing an elongated cutting tool 10 with a rotation axis $A_R$ extending longitudinally through the center thereof, front and rear ends (10A, 10B) defining forward and rearward directions ($D_F$, $D_R$), and a rotation direction $R_D$ being, in this example, counterclockwise when viewing the cutting tool 10 along the rearward direction $D_R$. Hereinafter, the terms "radially-outward" and "radially-inward" refer to radial directions relative to the rotation axis $A_R$.

The cutting tool 10 can be a rotary cutting tool. The cutting tool 10 can have a body portion 10C and a head portion 10D extending forwardly therefrom, and at least one cutting insert 12.

The head portion 10D can comprise a radially-outward facing curved peripheral surface 10E, a forwardly facing head surface 10F, and at least one cutting portion 14.

The at least one cutting insert 12 can be secured to the at least one cutting portion 14 via a clamping mechanism 16.

Referring now also to FIGS. 2A and 2B, the clamping mechanism 16 comprises a cam shaft 18, a clamp 20. The clamping mechanism 16 is configured to be brought between an unclamped position and a clamped position, as will be explained hereinafter.

As will be described in greater detail hereinafter, the cam shaft 18 and clamp 20 are configured to engage each other and, upon rotation of the cam shaft 18, transform rotary motion of the cam shaft 18 to linear motion of the clamp 20. Linear motion of the clamp 20 can allow the cutting insert 12 to be clamped to the cutting portion 14 as seen in FIG. 1.

It will be appreciated that a possible advantage of the clamping mechanism 16 is the small number of elements which it utilizes. In this example, the clamping mechanism 16 can achieve clamping of the cutting insert 12 to a cutting portion 14 of a cutting tool 10 with only two elements, namely the cam shaft 18 and clamp 20.

Drawing attention to FIGS. 3A to 3C, the cutting portion 14 will be described in further detail. The cutting portion 14 can be formed with an insert pocket defined between a first wall portion 14A extending rearwardly from the head surface 10F and spaced from the peripheral surface 10E, a second wall portion 14B extending from the first wall portion to the peripheral surface 10E and a seating surface 14C extending between the head surface 10F, the peripheral surface 10E and the first and second wall portions (14A, 14B).

The first wall portion 14A can have a radially-outward facing first wall side surface 14A1 extending from the seating surface 14C. The first wall side surface 14A1 can have two spaced abutment sub-surfaces (14A2, 14A3).

The second wall portion 14B can have a forwardly facing second wall side surface 14B1 extending from the seating surface 14C. The second wall side surface 14B1 can have an abutment sub-surface 14B2.

The cutting portion can be formed with a cutting portion bore 24 extending from the seating surface 14C, a cam recess 14D extending from the cutting portion bore 24 in a radially-inward direction, and a cam opening 26 extending from the peripheral surface 10E to the cutting portion bore 24 in a radially-inward direction and being coaxial with the cam recess 14D.

The cutting portion bore 24 can be defined between opposing first and second major surfaces (24A, 24B) and opposing first and second minor surfaces (24C, 24D) extending therebetween.

Figure 8A:
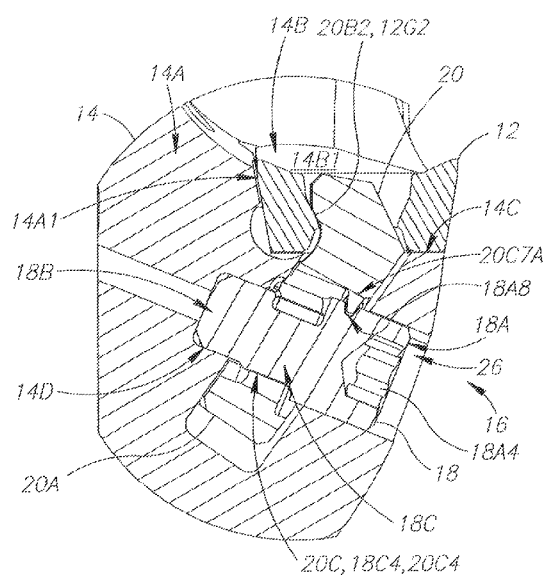
FIG. 8A is a cross section front view of a portion of the cutting tool in FIGS. 1 to 2B, in a clamped position.

The first major surface 24A can be disposed on an opposing side of the cutting portion bore 24 from the cam opening 26. The first major surface 24A can be slanted such that, when viewed in a rearward direction, it extends under a portion of the first wall portion 14A, as seen in FIG. 8A. The first major surface 24A can be formed with two spaced longitudinally extending reinforcement recesses (24A1, 24A2) extending from the seating surface 14C.

The second major surface 24B can be slanted in a direction parallel with the first major surface 24A.

The first minor surface 24C can be rearwardly facing and slanted at a similar angle as the first and second major surfaces (24A, 24B).

The second minor surface can be forwardly facing and can also be slanted at a similar angle as the first and second major surfaces (24A, 24B).

Referring now to FIG. 3B, the cam recess 10E can be coaxial with the cam opening 26. The cam recess 14D (FIG. 3A) can be formed in the first major surface 24A, and can have a peripheral surface 14D1 which extends from the first major surface 24A to an end wall portion 14D2. The cam recess 14D can have a diameter smaller than a diameter of the cam opening 26. The cam recess 14D can be coaxial with the cam opening 26 and can have a circular cross section. It is understood that, alternatively, the cam recess 14D can have a shape corresponding to that of the cam opening 26, as described below.

The cam opening 26 can be in the form of an aperture having a continuous edge 26A. A possible advantage of the cam opening 26 having a continuous edge 26A is that the cam opening 26 can be surrounded by material, providing a reinforced construction. Notably, the cam opening 26 is non-circular.

Figure 4A:
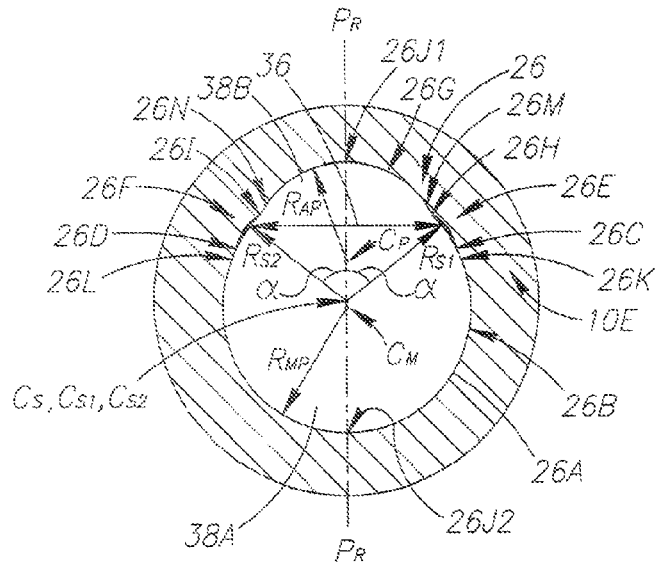
FIG. 4A is a partial schematic side view of a cam opening of the body portion in FIGS. 3A to 3C, which has been enlarged and portions of which have been drawn out of proportion for the purposes of explanation.

Referring to FIG. 4A, further features of the non-circular cam opening 26 are shown in a front view thereof (or a side-view of the cutting portion 14). While the further features are described with respect to the cam opening 26, they can be applied to any clamping mechanism opening. For example, the cam recess 14D can have any of the features mentioned below with respect to the cam opening 26 or alternative cam opening 26' shown in FIG. 4C.

The cam opening 26 can be defined, in a plan view thereof, by two spaced seating regions (26E, 26F), a major peripheral edge 26B and, in this non-limiting example, an additional peripheral edge 26G. The two spaced seating regions (26E, 26F) define between them a constriction (36) within the cam opening 26 (the constriction being indicated in FIG. 4A by the double-headed arrow). The major peripheral edge 26B is formed on a first side 38A of the constriction (36) and has two opposite major edge ends (26C, 26D). Each major edge end (26C, 26D) can be adjacent a corresponding one of the seating regions (26E, 26F). The additional peripheral edge 26G can be formed on a second side 38B of the constriction (36) and seating regions (26E, 26F), opposite from the major peripheral edge 26B. The second side 38B of the constriction 36 being distinct from the first side 38A thereof. The additional peripheral edge 26G can extend between two additional edge ends (26H, 26I), each additional edge end being, in this non-limiting example, adjacent a corresponding one of the seating regions (26E, 26F). A vertically extending imaginary plane $P_R$ of the cam opening 26 can pass between the two spaced seating regions (26E, 26F) and extend on both sides of the constriction (36).

The major peripheral edge 26B can have a concave shape. The major peripheral edge 26B can have a magnitude of radius $R_{MP}$ which is measured from a major center point $C_M$ of a largest possible circular arc which can be inscribed therein. The major peripheral edge 26B includes points (26K, 26L) directly adjacent each edge end (26C, 26D).

Figure 4B:
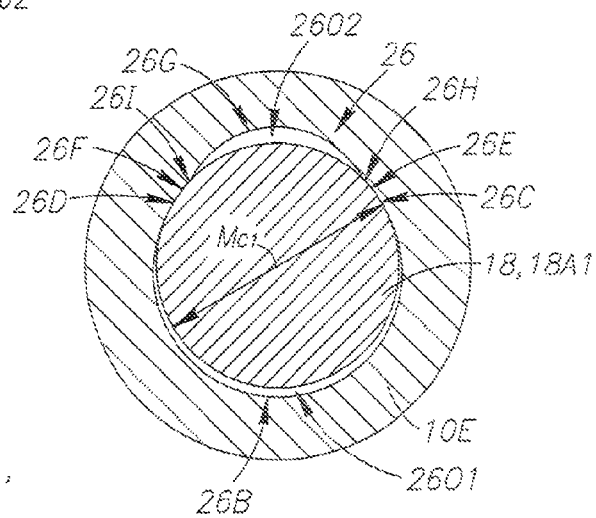
FIG. 4B is a partial schematic side view of the cam opening in FIG. 4A with a cam shaft of the cutting tool in FIGS. 1A to 2B, shown inserted therein.

It is understood that the "largest possible circular arc which can be inscribed" in the major peripheral edge 26B corresponds to a circular arc having a magnitude of radius which is larger than that of the cam shaft 18 shown in FIG. 4B. This explanation also applies to other major peripheral edges in accordance with the subject matter of the present application and to inscribed circles and inscribed circular arcs mentioned in connection with seating regions and additional peripheral edges.

The seating regions (26E, 26F) can each have a concave shape, in the plan view shown. The seating regions (26E, 26F) can each have a magnitude of radius ($R_{S1}$, $R_{S2}$), each radius being measured from a corresponding center point $C_{S1}$, $C_{s2}$, which in this non-limiting example are colocated and thereby together comprise a common center point $C_S$, of a largest possible circular arc which can be inscribed therein. The seating regions (26E, 26F) are spaced from each other. The seating regions (26E, 26F) can be closer to an uppermost central point 26J1 of the cam opening 2, than to a lowermost central point 26J2 which is disposed opposite the uppermost central point 26J1. In other words, an angle α formed between each seating region (26E, 26F) and the vertically extending imaginary plane $P_R$, which in this non-limiting example is a common angle, can be an acute angle. The plane $P_R$ can extend perpendicular to the rotation axis $A_R$. Both the uppermost central point 26J1 and the lowermost central point 26J2 can lie in the plane $P_R$.

In some instances, a given seating region, rather than having a concave shape in the plan view of the opening, may have a shape which can be characterized as a line segment. Such line segment can have a slope or average slope and a segment length. The center point for such a seating region may be defined as the point at which an imaginary line perpendicular to the midpoint of such a segment intersects the plane $P_R$. In this manner, center points may be defined for a non-concave seating region which forms a portion of the contour of the cam opening 26.

The additional peripheral edge 26G can have a concave shape. The additional peripheral edge 26G can have a magnitude of radius $R_{AP}$ which is measured from a center point $C_P$ of a largest possible circular arc which can be inscribed therein. The additional peripheral edge 26G can also comprise points (26M, 26N) directly adjacent each edge end (26C, 26D), which will be discussed hereinafter.

The major center point ($C_M$) and the additional center point ($C_P$) can be respectively located at one of the first and second sides (38A, 38B) of the constriction (36, 36'). More precisely in this example, the center points ($C_M$, $C_S$, $C_P$) of the major peripheral edge 26B, seating regions (26E, 26F) and additional peripheral edge 26G, can all be spaced from each other along the plane $P_R$.

Referring to FIG. 4B, a portion 18A1 of the cam shaft 18 is shown disposed in the cam opening 26 and forced thereagainst in a direction along the plane $P_R$ towards the uppermost central point 26J1.

Half of the magnitude of a maximum dimension $M_{C1}$ of the portion 18A1, which is equal to the magnitude of radius (R3; seen in FIG. 5B) thereof, is smaller than the magnitude of the radius $R_{MP}$ of the major peripheral edge 26B. Therefore, the major peripheral edge 26B is sized to allow the cam shaft 18 to be inserted in and rotated within the cam opening 26, when there is no force applied thereagainst in the direction, along the plane $P_R$ towards the uppermost central point 26J1, causing engagement with the seating regions (26E, 26F). The size difference also forms a proximal space 26O1, located between the cam shaft 18 and major peripheral edge 26B.

The magnitude of radius $R_{S1}$, $R_{S2}$ of the seating regions (26E, 26F) can be equal to a magnitude of the radius R3 of the first end 18A1 (FIG. 5B) of the cam shaft 18. The seating regions (26E, 26F) can have a curvature corresponding to the curvature of the first end 18A1 (FIG. 5B) of the cam shaft 18.

Even when a force is applied to the cam shaft 18 in the direction described, and the cam shaft 18 engages the seating regions (26E, 26F), the constriction (36) and the additional peripheral edge 26G are sized to form a distal space 26O2, the size being configured to restrict entry of the cam shaft 18 therein, i.e. within which the cam shaft 18 is not located. Stated differently, complete entry of the cam shaft 18 into the distal space 26O2 is restricted by engagement of the cam shaft 18 with the seating regions (26E, 26F). Consequently, the constriction (36) and the additional peripheral edge 26G are sized to prevent contact of the cam shaft 18 with the uppermost central point 26J1 thereof. Stated differently, the constriction 36 is sized to prevent passage of the cam shaft 18 therethrough to the extent that it can contact the additional peripheral edge 26G.

The engagement of the cam shaft 18 with more than one seating regions (26E, 26F) can be achieved by provision of the distal space 26O2.

It will be appreciated that any one of the clamping features mentioned above can possibly assist in restricting rotational motion of the cam shaft 18 when a force is applied thereon in a direction towards the seating regions (26E,26F):
   the curvature of the seating regions (26E, 26F) corresponding to the curvature of the cam shaft 18;
   engagement of the cam shaft 18 with more than one seating regions (26E, 26F); and
   each of the seating regions (26E, 26F) being disposed at an acute angle α from a point 26J1 towards which the motion of the cam shaft 18 is directed.

Figure 4C:
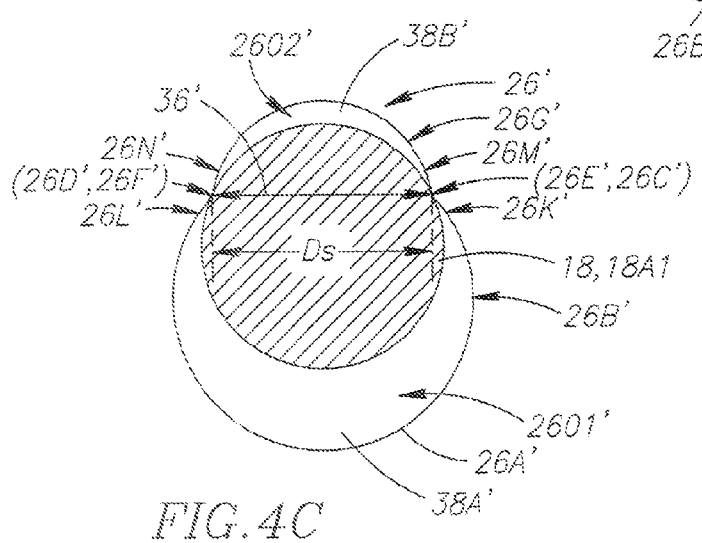
FIG. 4C is a schematic side view of another cam opening with a cam shaft of a cutting tool inserted therein.

Drawing attention to FIG. 4C, it will be understood that for a recessed area to be provided, the seating regions (26E, 26F) need not be elongated regions but can each be constituted by a single point (26E', 26F') in the plan view of the opening shown. In such case, the center points of the two seating regions (26E', 26F') merge into a common center point located where an imaginary line connecting the two seating regions (26E', 26F') intersects the plane $P_R$.

To elaborate, the non-limiting example of an alternative cam opening 26' in FIG. 4C has elements corresponding to elements of the cam opening 26 in FIGS. 4A and 4B, which are designated with identical numerals suffixed with an apostrophe, the only difference being that the alternative seating regions (26E', 26F') of alternative cam opening 26' are constituted by single points (26E', 26F') in the view shown.

The alternative cam opening 26' can comprise a major peripheral edge 26B' extending between alternative two edge ends (26C', 26D') which constitute seating regions (26E', 26F'). The cam opening 26' can also comprise an additional peripheral edge 26G' extending between, and engaging, the seating regions (26E', 26F').

While the example shown in FIGS. 4A and 4B is preferred due to possible additional advantages thereof, certain advantages are possibly attainable even by the example in FIG. 4C.

It will be understood that a clamping mechanism having an opening with any of the features above, that can provide any of the advantages above, can be advantageous. Some of the features are generalized below.

Such clamping mechanism opening can be defined as an opening provided with a major peripheral edge extending between two seating regions on one side of a constriction (36, 36') defined by the seating regions, and an additional peripheral edge extending between the two seating regions on a second, opposite side of the constriction (36, 36').

The constriction and the additional peripheral edge are sized to provide a space. The sizing can be configured to restrict entry of a cam shaft 18 into the space.

The seating regions can be defined as regions between the major peripheral edge and the additional peripheral edge. Portions of the major peripheral edge and the additional peripheral edge containing points (26K, 26K', 26L, 26L', 26M, 26M', 26N, 26N') are adjacent to the associated major and additional edge ends and also to the seating regions, and have center points ($C_M$, $C_P$) spaced from a common center point $C_S$ or center point $C_{S1}$, $C_{S2}$ of the seating regions (26E, 26F).

Center points of each portion along either the major peripheral edge or the additional peripheral edge can be spaced from a center point of the seating portions.

Center points of portions of the major peripheral edge and additional peripheral edge ($C_M$, $C_P$) which are directly adjacent to the seating regions, can be located on opposing sides of a common center point $C_S$ or center point $C_{S1}$, $C_{S2}$ of the seating portions (26E, 26F).

As seen in FIG. 4C, the magnitude of a dimension $D_S$ measured between the seating regions in a cam opening is smaller than a maximum dimension $M_{C1}$ of an end portion of a cam shaft configured to be received in the cam opening. The maximum dimension $M_{C1}$ can be an external diameter of an end portion of the cam shaft. Such magnitude of a dimension $D_S$ can be configured to prevent the cam shaft portion to pass therethrough. Such prevention can enable engagement of two spaced seating regions. Stated differently, single-point engagement of the cam shaft with the additional peripheral edge can be avoided.

Drawing attention to FIGS. 5A to 5E, the cam shaft 18 is shown in more detail. The cam shaft 18 can have a unitary one-piece construction. The cam shaft 18 can be elongated with a central longitudinal axis $A_L$ extending through the center thereof, and can comprise first and second cam ends (18A, 18B) and a central cam portion 18C extending therebetween. The cam shaft 18 can have a circumferential external cam surface 18D along the periphery of the cam shaft 18.

The first cam end 18A can be cylindrical with first and second end sections (18A1, 18A2) and a central section 18A3 extending therebetween.

The first end section 18A1 can be formed with tool receiving recess 18A4.

The second end section 18A2 can be formed with a notch 18A5 at the external cam surface 18D. The notch 18A5 can extend longitudinally along the cam shaft 18.

The central section 18A3 can comprise an unclamping section 18A6. The unclamping section 18A6 can be constituted by a groove formed in the central section 18A3. The groove 18A6 can extend along a plane $P_G$ which is perpendicular to the longitudinal axis $A_L$. The groove 18A6 can extend along a majority of the circumference of the central section 18A3. The groove 18A6 can have a first end 18A7, a second end (not shown) and a central portion 18A8 therebetween. The groove 18A6 can have a varying depth or diameter along the circumferential direction. The varying depth can follow a growth pattern. The growth pattern can form a spiral shape. The spiral shape can be an Archimedean spiral. The varying depth can continuously deepen from the first end 18A7 until the second end. The groove 18A6 can also have varying longitudinal width along the circumferential direction. The groove's longitudinal width, as measured along a direction parallel to the longitudinal axis $A_L$, may increase in magnitude from the first end 18A7 until the second end. In other words, the groove's longitudinal width may increase with its depth, along the circumferential direction of the cam shaft.

The notch 18A5 can start from the beginning of the second cam end 18A2 and extends to the unclamping section 18A6. The notch 18A5 intersects the unclamping section 18A6 at the central portion 18A8 thereof. In other words, the notch 18A5 is circumferentially spaced apart first and second ends 18A7 of the unclamping section 18A6.

The second end section 18A2 has a radius R3 and can be disposed between the central portion of the groove 18A8, which has a maximum radius smaller than R3, and the central cam portion 18C which has a radius R4 which also has a radius smaller than R3. Accordingly, the second end section 18A2 has the shape of an annular projection. The radius R4 can be the radius of greatest magnitude of the central cam portion 18C.

The second cam end 18B can have a radius R5, which can be sized to allow insertion thereof into the cam recess 14D.

The central cam portion 18C can comprise a clamping section 18C1. The external cam surface 18D of the central cam portion 18C can include a flat region 18C2 extending between first and second ends thereof (18C2A, 18C2B), and a cam shoulder-abutment region 18C3 extending from the first end 18C2A of the flat region 18C2, and an arcuate, cam growth pattern region 18C4 extending from, while growing in a radially-outward direction from the longitudinal axis $A_L$, the second end 18C2B of the flat region 18C2 to the cam shoulder-abutment region 18C3.

The cam growth pattern region 18C4 has a varying diameter along the circumferential direction. The varying diameter follows a growth pattern. The growth pattern can form a spiral shape. The spiral shape can be an Archimedean spiral.

Notably the growth patterns of the unclamping section 18A6 and the cam growth pattern region 18C4 of the clamping section 18C1, grow in opposite circumferential directions. To explain using the present example, from a front view perspective of the cam shaft 18 and using the longitudinal axis $A_L$ as a reference, a magnitude of radius of the unclamping section 18A6 decreases in a clockwise direction, whereas a magnitude of radius of the cam growth pattern region 18C4 increases in a clockwise direction.

Drawing attention to FIGS. 6A to 6E, the clamp 20 is shown in more detail. The clamp 20 can have a unitary one-piece construction. The clamp 20 can comprise a clamp body portion 20A and a clamp head portion 20B, and can be formed with a clamp through-bore 20C. The clamp can have opposing front and rear major clamp faces (20D, 20E), first and second minor clamp faces (20F, 20G) extending perpendicular thereto, and top and bottom clamp faces (20H, 20I) perpendicular to each of the front and rear major clamp faces and first and second minor clamp faces (20D, 20E, 20F, 20G). A central longitudinal plane $P_L$ can extend through the center of the clamp 20, the first and second minor clamp faces (20F, 20G) and the top and bottom clamp faces (20H, 20I), and can be parallel with the front and rear major clamp faces (20D, 20E). A bore axis $A_B$ can extend through the clamp through-bore 20C via the front and rear major clamp faces (20D, 20E), and can be slanted relative to the central longitudinal plane $P_L$ (i.e. not perpendicular or parallel therewith, for example as seen in FIG. 6D). The clamp 20 can be elongated between the top and bottom faces (20H, 20I) thereof. The clamp 20 can have a greater dimension of magnitude between the first and second minor faces (20F, 20G) than between the front and rear major clamp faces (20D, 20E).

The clamp body portion 20A can comprise, at the major face 20D thereof, spaced longitudinal reinforcement ribs 20A1 extending parallel with the central longitudinal plane $P_L$.

The clamp body portion 20A can be formed, at the first minor face 20F thereof, with a side recess 20A2 and a side pivot projection 20A3.

The clamp body portion 20A can be formed, at the rear clamp face 20E thereof, with a rear recess 20A4, and a rear pivot projection 20A5.

The side recess 20A2 can extend from an intersection of the first minor clamp face 20F and the bottom face 20I along a portion of the first minor clamp face 20F. The side pivot projection 20A3 can constitute a remaining non-recessed portion at the first minor clamp face 20F. It will be understood that the second minor clamp face 20G can comprise a similar side recess and pivot projection (not shown), for increased versatility of use of the clamp.

The rear recess 20A4 can extend along a portion of the rear major clamp face 20E between the second minor clamp face 20F, and top and bottom clamp faces (20H, 20I). The rear pivot projection 20A5 can constitute a remaining non-recessed portion at the rear major clamp face 20E.

The clamp head portion 20B can extend transversely relative to clamp body portion 20A. Stated differently, the clamp head portion 20B can extend transverse to the central longitudinal plane $P_L$. The clamp head portion 20B can extend to only one side of the central longitudinal plane $P_L$.

The clamp head portion 20B can have a rectangular cross section. The clamp head portion 20B can be elongated and extend between the first and second minor clamp faces (20F, 20G). The clamp head portion 20B can have two spaced front projecting portions (20B1, 20B2) formed at the front major clamp face thereof 20D. The two spaced front projecting portions (20B1, 20B2) can each be respectively adjacent one of the first and second minor clamp faces (20F, 20G). The clamp head portion 20B can have a first side projecting portion 20B3 formed at the second minor clamp face thereof 20G. The clamp head portion 20B can have an additional, second side projecting portion 20B4 formed at the first minor clamp face thereof 20F.

The clamp 20 can comprise a guide arrangement 20A6. The guide arrangement, in the present example, can comprise the side recess, rear recess, pivot projection of the side recess and pivot projection of the rear recess (20A2, 20A3, 20A4, 20A5).

The clamp through-bore 20C can be elongated. The elongation can be along a dimension extending between the top and bottom clamp faces (20H, 20I). The clamp through-bore 20C can comprise an internal clamp surface 20C1.

The internal clamp surface 20C1 can comprise a clamping section 20C2 and an unclamping section 20C3.

The clamping section 20C2 can be closer to the front major clamp face 20D than to the rear major clamp face 20E. The clamping section 20C2 can be formed with a flat region 20C4 extending between first and second ends thereof (20C4A, 20C4B), and a clamp shoulder-abutment region 20C5 extending from the first end 20C4A of the flat region 20C4, and a clamp growth pattern region 20C6 extending from, while growing in a radially-outward direction from the longitudinal axis $A_B$, the second end 20C4B of the flat region 20C4 to the clamp shoulder-abutment region 20C5.

The flat region 20C4 can have a magnitude of radius corresponding diameter to the greatest radius R4 of the central cam portion 18C. The flat region 20C4 can be located closer to the bottom clamp face 2C1 than to the top clamp face 20H.

The clamp growth pattern region 20C6 has a varying diameter. The varying diameter follows a growth pattern. The growth pattern can form a spiral shape. The spiral shape can be an Archimedean spiral.

The unclamping section 20C3 can be closer to the rear major clamp face 20E than to the front major clamp face 20D. The unclamping section 20C3 can comprise a clamp projection 20C7.

The clamp projection 20C7 can extend in a radially-inward direction into the clamp through-bore 20C. The clamp projection 20C7 can extend from a portion of the internal clamp surface 20C1, which portion is proximate the top clamp face 20H. The clamp projection 20C7 can have a tapered shape, which decreases in size at increasing distances from the internal clamp surface 20C1. The clamp projection 20C7 can comprise a front surface 20C7A facing in the direction of the front major clamp face 20D, a rear surface 20C7B facing in the direction of the rear major clamp face 20E, and a bottom surface 20C7C facing in a radially-inward direction into the clamp through-bore 20C.

Drawing attention to FIGS. 7A to 7D, the cutting insert 12 is shown in more detail. The cutting insert 12 can be an indexable insert, and can be manufactured by form-pressing or by injection molding and then sintering carbide powders. The cutting insert 12 can have first and second ends (12A, 12B), a central portion 12C extending therebetween, and upper and lower surfaces (12D, 12E). The cutting insert 12 can be elongated with a longitudinal cutting insert axis $A_H$ extending through the center thereof via the first and second ends (12A, 12B). A transverse cutting insert axis $A_F$ can extend through the center of the central portion 12C and can be oriented perpendicular to the longitudinal cutting insert axis $A_H$. As seen in the plan view of FIG. 7A, the cutting insert 12 has a pair of opposing, generally straight longitudinal side surfaces 12M connected by transversely extending lateral side surfaces 12N. In the embodiment shown, each of the lateral side surfaces 12N are angled proximate the longitudinal cutting insert axis $A_H$.

The cutting insert 12 can be formed with a cutting insert through bore 28 extending between, and opening out to, the upper and lower surfaces (12D, 12E). The cutting insert through bore 28 is located between opposing first and second longitudinal walls (12F, 12G) extending parallel with the longitudinal cutting insert axis $A_H$, and opposing first and second transverse walls (12H, 12I) extending perpendicular to the longitudinal cutting insert axis $A_H$.

Each transverse wall (12H, 12I) can be formed with a raised cutting corner (12H1, 12I1) diagonally opposed to the raised cutting corner of the other transverse wall (12H1, 12I1).

The lower surface 12E can be flat.

In a plan view, the cutting insert through bore 28 can have a rectangular shape. The cutting insert through bore 28 can further be defined between an inner surface (12F1, 12G1, 12H2, 12I2) of each of the first and second longitudinal walls (12F, 12G) and first and second transverse walls (12H, 12I). Thus, the first and second longitudinal walls (12F, 12G) extends, relative to the longitudinal cutting insert axis $A_H$, a length and axial position common to the cutting insert through bore 28. Stated differently, each of the first and second longitudinal walls (12F, 12G) is defined within axial locations at which the inner surfaces (12H2, 12I2) intersect the longitudinal cutting insert axis $A_H$. The remainder of the cutting insert 12 can be constituted by the first and second transverse walls (12H, 12I).

Each of the inner surfaces (12F1, 12G1) of the first and second longitudinal walls (12F, 12G) can be formed with a protruding clamping lip (12F2, 12G2). Each protruding clamping lip (12F2, 12G2) can be elongated in a direction parallel with the longitudinal cutting insert axis $A_H$. Each protruding clamping lip (12F2, 12G2) can be spaced from the upper surface 12D. Each protruding clamping lip (12F2, 12G2) can be slanted, such that as it approaches the lower surface 12E it also approaches the insert axis $A_C$. An upper abutment surface (12F3, 12G3) of each protruding clamping lip (12F2, 12G2) can face in the direction of the upper surface 12D. Each protruding clamping lip (12F2, 12G2) can be configured to withstand alone the entire clamping force of the clamping mechanism 16. Such configuration can be via the sizing of the respective protruding clamping lip (12F2, 12G2). Spaced apart clamp engagement points on one of the protruding clamping lips (12G2) are shown designated as (12G2A, 12G2B). It will be appreciated that each protruding clamping lip (12G2, 12F2) can have such clamp engagement points. The inner surfaces (12F1, 12G1) of the first and second longitudinal walls (12F, 12G) can be parallel with opposing outer surfaces (12F4, 12G4) of the longitudinal walls (12F, 12G).

A cross sectional area $C_A$ of each longitudinal wall (12F, 12G), measured perpendicular to the longitudinal cutting insert axis $A_H$, can be the same at each axial location along the longitudinal cutting insert axis $A_H$. The cross sections of the longitudinal walls (12F, 12G) can be devoid of recesses which can lower the constructional strength thereof.

The inner surfaces (12H2, 12I2) of the first and second transverse walls (12H, 12I) can be flat, at least proximate the upper surface 12D. Each inner surface (12H2, 12I2) of the first and second transverse walls (12H, 12I) can be devoid of a protruding clamping lip having a surface facing the upper surface 12D. A clamp engagement point on the inner surface (12I2) of the second transverse wall (12I) is shown designated as (12I2A). The clamp engagement point on the inner surface (12I2) is closer to the second longitudinal wall (12G) than to the first longitudinal wall (12F). It will be appreciated that the first transverse wall (12H) can also have such a clamp engagement point.

The cutting insert 12 can have 180° rotational symmetry about a cutting insert axis $A_C$ which is perpendicular to both axes $A_H$ and $A_F$. In the embodiment shown, the cutting insert 12 is single-sided (though still indexable) with the upper and lower surfaces (12D, 12E) having dissimilar shapes and the lower surface (12D) being only suitable for seating while only the upper surface (12D) is provided with cutting edges.

Referring now to FIG. 8A, the clamping mechanism 16 is shown in a clamped position and is securely holding the cutting insert 12 to the cutting portion 14.

To elaborate, clamp body portion 20A is disposed inside the cutting portion bore 24.

The cam shaft 18 is disposed in the cutting portion 14, with the first cam end 18A disposed in the cam opening 26, the second cam end 18B disposed in the cam recess 14D, and the central cam portion 18C extending through the clamp through bore 20C.

To reach the clamped position, the cam shaft 18 has been rotated in a clockwise direction via a tool (not shown) inserted in the tool receiving recess 18A4. During such rotation the cam growth pattern region 18C4 engages the flat region 20C4 of the clamp 20 to cause downward motion thereof. Rotation of the cam shaft 18 can be stopped by the cam growth pattern region's 18C4 greatest radius engaging the flat region 20C4 and being arrested by contact therewith.

Referring briefly to FIG. 4A, engagement of the cam growth pattern region's 18C4 with the flat region 20C4 can cause a slight upward levering of the first cam end 18A against the seating regions (26E, 26F). As the seating regions (26E, 26F) have a constricted portion 36 having a magnitude of distance smaller than the magnitude of the external dimension $M_{C1}$ (or twice the magnitude of the radius R3), the first cam end 18A engages both regions (26E, 26F).

A possible advantage of having multiple seating regions, as opposed to a single seating region, is that undesired rotation of the cam shaft 18 can be hindered. It is believed that positioning each seating region (26E, 26F) spaced from the uppermost central point 26J, at an acute angle, provides an optimal result for the example embodiment shown, however other positions are also possible.

Reverting to FIG. 8A, the clamp projection 20C7 extends into the central portion 18A8 of the unclamping section 18A6 and can prevent undesired ejection of the cam shaft 18 from the cutting portion 14, during a cutting operation, via contact of the front surface 20C7A thereof with the central portion 18A8.

Desired insertion and extraction of the cam shaft 18 from the clamp 20 can be carried out by aligning the clamp projection 20C7 with the notch 18A5 (FIG. 5C), which is sized to receive a portion of the clamp projection therein, and moving the portion of the clamp projection (20C7) therethrough.

It will be appreciated that the notch 18A5 can be circumferentially spaced from the first and second ends of the unclamping section 18A6 (FIG. 5C) to prevent undesired ejection of the cam shaft 18 when in the clamped or unclamped positions.

It is further noted that rotation of the cam shaft 18 in one direction causes linear motion of the clamp 20 downwards into the cutting portion bore 24. Referring also to FIGS. 6B and 7A, pivotal movement about the side pivot projection 20A3, permitted due to the side recess 20A2, allows the side projecting portion 20B3 to engage the inner surface 12I2 of the cutting insert 12. Similarly, pivotal movement about the rear pivot projection 20A5, permitted due to the side recess 20A2, allows both of the spaced projecting portions (FIG. 6A; 20B1, 20B2) to engage the upper abutment surface 12G3 of the cutting insert 12.

It will be understood that the clamp 20 can therefore be configured to engage the cutting insert 12 at three points. In particular, each of the three projecting portions (20B1, 20B2, 20B3) of the clamp 20 is configured to respectively engage one of the clamp engagement points (12G2A, 12G2B, 12I2A) of the cutting insert 12.

Such an arrangement can clamp the cutting insert 12 in a direction opposite to the direction from which the cutting insert 12 can exit the pocket. In the present example which is a rotary tool 10, the arrangement can oppose the centrifugal forces applied on the cutting insert 12 during rotation of the tool 10. The movement of the clamp 20 can directly apply force on the cutting insert 12 against the seating surface 14C. The clamping position can be devoid of contact between the clamp 20 and portions of the cutting insert which are spaced from the walls (14A, 14B) of the cutting portion 14.

Figure 8B:
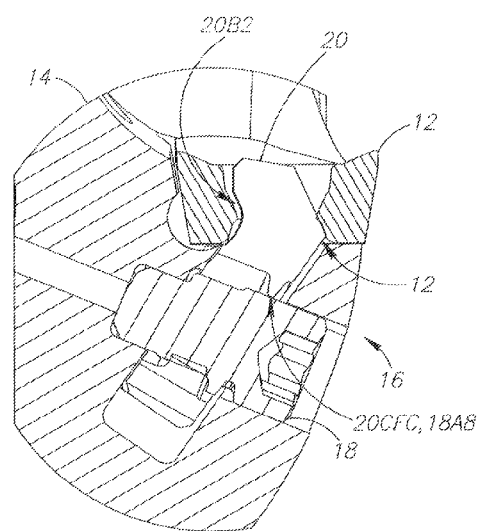
FIG. 8B is a cross section front view of the portion of the cutting tool in FIG. 8A, in an unclamped position.

Referring now to FIG. 8B, to reach the unclamped position, the cam shaft 18 has been rotated in a counterclockwise direction and the clamp body portion 20A is partially protruding from the cutting portion bore 24. Engagement of the bottom surface 20C7C of the clamp projection 20C7 with the central portion 18A8 of the unclamping section 18A6 causes upward motion of the clamp 20. Rotation of the cam shaft 18 can be stopped by abutment of the cam shaft's cam shoulder abutment region 18C3 (FIG. 5D) with the clamp's clamp shoulder abutment region 20C5 (FIG. 6B).

Notably, the elongated shape of the clamp through bore 20C can allow the cam shaft 18 to remain extending therethrough in both the clamped and unclamped positions. Consequently the cam shaft 18 can function to both move and arrest motion of the clamp 20 without an additional element needed for one of these two functions.

After being brought to the unclamped position the side projecting portion 20B3 and spaced projecting portions (20B1, 20B2) no longer engage the cutting insert 12, which can thus be removed from the cutting portion 14.

A possible advantage of the clamping mechanism 16 is that it can be brought to both the clamped and unclamped positions with the cam shaft 18 and clamp 20 both still being secured to the clamping portion 14.

It is further noted that the cutting insert 12 can be indexable, allowing clamping via the other upper abutment surface 12F3 of the cutting insert 12.

A gradual spiral shape of the clamping and/or unclamping sections (18A6, 18C1, 20C2, 20C3) can prevent unintentional unclamping of the clamping mechanism 16.

The cam opening 26 can be directed radially outward from the cutting portion 14 to allow ease of access thereto, which can reduce wear of the tool receiving recess 18A4.

The elongated shape of the cutting insert 12 and/or the through-bore 28 thereof can allow a tool 10 of small diameter or width to be utilized.

It will be understood that the claims hereinafter should not be limited to specific names of axes, which were used above for the purpose of describing specific non-limiting embodiments. Therefore, for example, while the example described above was of a rotary tool, if the claims of the present application are not explicitly limited to a rotary tool, the so-called rotation axis $A_R$, can be used in the claim as a central axis and not one relating specifically to rotation. Similarly, the longitudinal axis of the cam shaft $A_L$ can also be a central axis in cases where the cam shaft is not defined in a claim as being elongated, etc.

What is claimed is:

1. A cutting insert (12) comprising:
   opposing upper and lower surfaces (12D, 12E), opposing longitudinal side surfaces (12M) and opposing lateral side surfaces (12N) extending transversely to and connecting the opposing longitudinal side surfaces (12M);
   a cutting insert through bore (28) passing between the opposing upper and lower surfaces (12D, 12E), the cutting insert through bore (28) having an elongated shape in a plan view of the upper surface (12D);
   opposing first and second longitudinal walls (12F, 12G) extending between the upper and lower surfaces (12D, 12E) and defined between a portion of each of the longitudinal side surfaces (12M) and the through bore (28); and
   opposing first and second transverse walls (12H, 12I) extending between the opposing upper and lower surfaces (12D, 12E), and extending transverse, and connected, to the opposing first and second longitudinal walls (12F, 12G); wherein:
   the cutting insert through bore (28) being defined between inner surfaces (12F1, 12G1, 12H2, 12I2) of the opposing first and second longitudinal walls (12F, 12G) and the first and second transverse walls (12H, 12I);
   a longitudinal cutting insert axis ($A_H$) extends between the inner surfaces (12F1 12G1) of the opposing first and second longitudinal walls;
   a transverse cutting insert axis ($A_F$) extends between the inner surfaces (12H2, 12I2) of the opposing first and second transverse walls, the transverse cutting insert axis ($A_F$) being perpendicular to the longitudinal cutting insert axis ($A_H$):,
   the cutting insert is two-way indexable and has 180° rotational symmetry about a cutting insert axis ($A_C$) perpendicular to both the longitudinal cutting insert axis ($A_H$) and the transverse cutting insert axis ($A_F$);
   each of the inner surfaces (12F1, 12G1) of the first and second longitudinal walls (12F, 12G) is formed with a protruding clamping lip (12F2, 12G2) which projects into the through bore (28);
   the clamping lips (12F2, 12G2) are located on either side of said longitudinal cutting insert axis ($A_H$), in a top view of the cutting insert; and
   each inner surface (12H2, 12I2) of the first and second transverse walls (12H, 12I) are devoid of a protruding clamping lip having a surface facing the upper surface (12D).

2. The cutting insert (12) according to claim 1, wherein each protruding clamping lip (12F2, 12G2) is elongated in a direction parallel with the longitudinal cutting insert axis ($A_H$) of the cutting insert.

3. The cutting insert (12) according to claim 1, wherein each protruding clamping lip (12F2, 12G2) is spaced from the upper surface (12D).

4. The cutting insert (12) according to claim 1, wherein each protruding clamping lip (12F2, 12G2) is slanted towards the longitudinal cutting insert axis ($A_H$) and in the direction of the lower surface (12E), such that an upper abutment surface thereof (12F3, 12G3) faces in the direction of the upper surface (12D).

5. The cutting insert (12) according to claim 1, wherein the inner surfaces (12H2, 12I2) of the first and second transverse walls (12H, 12I) are flat.

6. The cutting insert (12) according to claim 1, wherein a cross sectional area $C_A$ of each longitudinal wall (12F, 12G), measured perpendicular to the longitudinal cutting insert axis $A_H$ of the cutting insert (12) is the same at each axial location along the longitudinal cutting insert axis $A_H$.

7. The cutting insert (12) according to claim 1, wherein the cutting insert through bore (28) has a rectangular shape.

8. The cutting insert (12) according to claim 1, wherein the cross sections of the longitudinal walls (12F, 12G) are devoid of recesses.

9. The cutting insert (12) according to claim 1, wherein:
   the cutting insert (12) is single-sided, though indexable, with the upper and lower surfaces (12D, 12E) having dissimilar shapes;
   only the lower surface (12D) is suitable for seating; and
   only the upper surface (12D) is provided with cutting edges.

10. A cutting tool (10) comprising a cutting portion (14) and a clamping mechanism (16) configured to be brought between an unclamped position in which a cutting insert (12) is removable from the cutting portion (14), and a clamped position in which the cutting insert (12) is clamped to the cutting portion (14); wherein:

the cutting portion (14) comprises a seating surface (14C) and a peripheral surface (10E) extending therefrom, a cutting portion bore (24) formed in the seating surface (14C), and a cam opening (26) formed in the peripheral surface (10E) and extending to the cutting portion bore (24);

the clamping mechanism (16) comprising a clamp (20) and an elongated cam shaft (18);

the clamp (20) comprises a clamp body portion (20A) disposed at least partially inside the cutting portion bore (24), a clamp head portion (20B) connected to the clamp body portion (20A) and disposed external to the cutting portion bore (24), and a clamp through-bore (20C) formed in the clamp body portion (20A) and comprising an internal clamp surface (20C1) formed with a clamp growth pattern region (20C6) having a varying diameter;

the cam shaft (18) comprises an external cam surface (18D), a first cam end (18A) and a central cam portion (18C) extending from the first cam end (18A);

the central cam portion (18C) having a clamping section (18C1) formed with a cam growth pattern region (18C4) having a varying diameter;

the first cam end (18A) being disposed in the cam opening (26) and the central cam portion (18C) being disposed in the clamp through-bore (20C); and the clamp and cam growth pattern regions (20C6, 18C4) being configured for engaging each other to transform rotary motion of the cam shaft (18) into linear motion of the clamp (20) to thereby bring the clamping mechanism (16) into the clamped position in which the clamp head portion (20B) is closer to the seating surface (14C) than it is in the unclamped position.

11. The cutting tool (10) according to claim 10, wherein the cam shaft (18) and clamp (20) are the only elements of the clamping mechanism (16).

12. The cutting tool (10) according to claim 10, wherein the cam shaft (18) further comprises an unclamping section (18A6) configured for causing linear motion of the clamp (20) away from the seating surface (14C) to bring the clamping mechanism (16) into the unclamped position.

13. The cutting tool (10) according to claim 10, wherein the unclamping section (18A6) comprises a groove having a varying depth.

14. The cutting tool (10) according to claim 12, wherein the clamp (20) comprises a clamp projection (20C7) configured for engaging the unclamping section (18A6) of the cam shaft (18) and causing movement of the clamp (20) in a direction away from the seating surface (14C).

15. The cutting tool (10) according to claim 10, wherein the clamp (20) comprises a clamp projection (20C7) configured for engaging the cam shaft (18) and preventing undesired ejection of the cam shaft (18) from the cutting portion (14) in the clamped and unclamped positions.

16. The cutting tool (10) according to claim 10, wherein the external cam surface (18D) of the cam shaft (18) is formed with a notch (18A5) extending to an unclamping section (18A6) of the cam shaft (18) and sized to allow a portion of a clamp projection (20C7) of the clamp (20) to pass therethrough.

17. The cutting tool (10) according to claim 10, wherein the cam shaft (18) comprises an unclamping section (18A6) and a clamping section (18C1), both having varying diameters which follow growth patterns in opposite directions.

18. The cutting tool (10) according to claim 10, wherein: the cam shaft (18) further comprises a cam shoulder abutment region (18C3), the clamp (20) further comprises a clamp shoulder abutment region (20C5), and the cam and clamp shoulder abutment regions (18C3, 20C5) are configured to abut each other for stopping rotation of the cam shaft (18) at the unclamped position.

19. The cutting tool (10) according to claim 10, wherein: the cutting portion (14) is formed with a cam recess (14D) coaxial with the cam opening (26); the cam shaft (18) further comprises a second cam end (18B) which extends in an axial direction from the central cam portion (18C) on the opposite side of the first cam end (18A); and the cam recess (14D) is configured to receive the second cam end (18B).

20. The cutting tool (10) according to claim 10, wherein: the cam opening (26) comprises first and second spaced seating regions (26E, 26F) defining a constriction (36) in the opening (26), a major peripheral edge (26B) extending from the first seating region (26E) to the second seating region (26F) and formed on a first side (38A) of the constriction (36), an additional peripheral edge (26G) extending from the first seating region (26E) to the second seating region (26F) and formed on a second side (38B) of the constriction (36) distinct from the first side (38A) of the constriction (36).

21. The cutting tool (10) according to claim 10, wherein the clamp (20), at a first clamp face (20E, 20F) thereof, further comprises: a guide arrangement (20A6) comprising a first recess (20A2, 20A4) and an associated first pivot projection (20A3, 20A5).

22. The cutting tool (10) according to claim 21, wherein, at a second clamp face (20E, 20F) which is distinct from the first clamp face (20E, 20F): the guide arrangement (20A6) further comprises a second recess (20A2, 20A4) and an associated second pivot projection (20A3, 20A5).

23. The cutting tool (10) according to claim 10, wherein the clamp head portion (20B) comprises a projecting portion (20B3) formed at a first clamp face (20G) of the clamp (20).

24. The cutting tool (10) according to claim 23, wherein the clamp head portion (20B) further comprises two spaced projecting portions (20B1, 20B2) formed at a second clamp face (20D) of the clamp (20), which second clamp face (20D) is distinct from the first clamp face (20G).

25. The cutting tool (10) according to claim 10, wherein the clamp (20) is configured to engage the cutting insert (12) with exactly three projecting portions (20B1, 20B2, 20B3) formed on the clamp head portion (20B).

26. The cutting tool (10) according to claim 25, wherein: the cutting portion (14) further comprises first and second wall portions (14A, 14B) which, together with the seating surface (14C), define an insert pocket of the cutting portion (14); a cutting insert (12) according to any one of claims 1 to 6, is retained in the cutting portion (14), the cutting insert (12) having a plurality of clamp engagement points (12G2A, 12G2B, 12I2A) on an inner surface thereof; each of the three projecting portions (20B1, 20B2, 20B3) is configured to engage the cutting insert (12) at a single corresponding clamp engagement point (12G2A, 12G2B, 12I2A); and each clamp engagement point is adjacent to one of the first and second wall portions (14A, 14B) of the cutting portion (14).

27. A cutting insert (12) comprising:
opposing upper and lower surfaces (12D, 12E), opposing longitudinal side surfaces (12M) and opposing lateral side surfaces (12N) extending transversely to and connecting the opposing longitudinal side surfaces (12M);

a cutting insert through bore (28) passing between the opposing upper and lower surfaces (12D, 12E), the cutting insert through bore (28) having an elongated shape in a plan view of the upper surface (12D);

opposing first and second longitudinal walls (12F, 12G) extending between the upper and lower surfaces (12D, 12E) and defined between a portion of each of the longitudinal side surfaces (12M) and the through bore (28); and opposing first and second transverse walls (12H, 12I) extending between the opposing upper and lower surfaces (12D, 12E), and extending transverse, and connected, to the opposing first and second longitudinal walls (12F, 12G); wherein:

the cutting insert through bore (28) being defined between inner surfaces (12F1, 12G1, 12H2, 12I2) of the opposing first and second longitudinal walls (12F, 12G) and the first and second transverse walls (12H, 12I);

each of the inner surfaces (12F1, 12G1) of the first and second longitudinal walls (12F, 12G) is formed with a protruding clamping lip (12F2, 12G2) which projects into the through bore (28);

each protruding clamping lip (12F2, 12G2) is located one side of a longitudinal cutting insert axis ($A_H$) extending between the inner surfaces (12F1, 12G1) of the opposing first and second longitudinal walls (12F, 12G), in a top view of the cutting insert; and each protruding clamping lip is elongated in a direction parallel with the longitudinal cutting insert axis ($A_H$) of the cutting insert, and has a length along longitudinal cutting insert axis which is greater than a width perpendicular to the longitudinal cutting insert axis, in a top view of the cutting insert.

\* \* \* \* \*